United States Patent [19]

Rumberger

[11] Patent Number: 5,318,374
[45] Date of Patent: Jun. 7, 1994

[54] COMPOSITE TUBE STRUCTURE

[75] Inventor: William E. Rumberger, Newtown Square, Pa.

[73] Assignee: The Boeing Company, Seattle, Wash.

[21] Appl. No.: 948,588

[22] Filed: Sep. 23, 1992

[51] Int. Cl.⁵ ............................................. F16B 2/02
[52] U.S. Cl. ................................. 403/277; 403/370; 403/374; 403/404; 464/182
[58] Field of Search ............... 403/370, 374, 43, 157, 403/158, 291, 404, 277; 464/181, 182; 29/446, 451, 456, 525.1; 285/149, 249, 255

[56] References Cited

U.S. PATENT DOCUMENTS

| | | | |
|---|---|---|---|
| 157,840 | 12/1874 | Kennedy | 285/255 X |
| 1,388,657 | 8/1921 | Macdonald et al. | 285/222 |
| 1,802,499 | 4/1931 | Chapman | 285/255 X |
| 2,441,718 | 5/1948 | Parker et al. | 285/149 |
| 2,446,846 | 8/1948 | Noble | 29/525.1 X |
| 3,572,778 | 3/1971 | Cassel | 29/525.1 X |
| 4,185,472 | 1/1980 | Yates et al. | 464/181 |
| 4,238,539 | 12/1980 | Yates et al. | 428/36 |
| 4,256,412 | 3/1981 | Tybus et al. | 285/174 X |
| 4,277,197 | 7/1981 | Bingham | 403/104 |
| 4,388,013 | 6/1983 | Bergheim | 403/277 |
| 4,582,444 | 4/1986 | Miskinis | 403/16 |
| 4,792,320 | 12/1988 | Nickel | 464/181 |
| 4,793,040 | 12/1988 | Rumberger | 29/525.1 |
| 4,838,831 | 6/1989 | Rumberger | 464/88 |
| 4,849,152 | 7/1989 | Rumberger | 264/308 |

FOREIGN PATENT DOCUMENTS

| | | | |
|---|---|---|---|
| 462116 | 7/1928 | Fed. Rep. of Germany | 285/255 |
| 883986 | 7/1953 | Fed. Rep. of Germany | 403/370 |
| 2619257 | 11/1976 | Fed. Rep. of Germany | 403/370 |
| 2821677 | 11/1979 | Fed. Rep. of Germany | 464/181 |
| 541213 | 9/1955 | France | 403/370 |

Primary Examiner—Randolph A. Reese
Assistant Examiner—Harry C. Kim
Attorney, Agent, or Firm—Jones, Tullar & Cooper

[57] ABSTRACT

A composite tube structure is disclosed in which the end of the composite tube is either flared out at the end or is tapered in at the end and the flared or tapered portion is accurately formed to its final dimension so as to require no machining to size. An end assembly is applied to the end of the tube which has inner and outer portions fitting precisely into the inner and outer surfaces of the end of the tube. The inner and outer end pieces are drawn axially together to secure the tube in the end assembly between the inner and outer portions under a predetermined radial stress. The tube is secured to the end assembly without the use of pins or other fasteners which require severing the fiber strands of the tube.

8 Claims, 3 Drawing Sheets

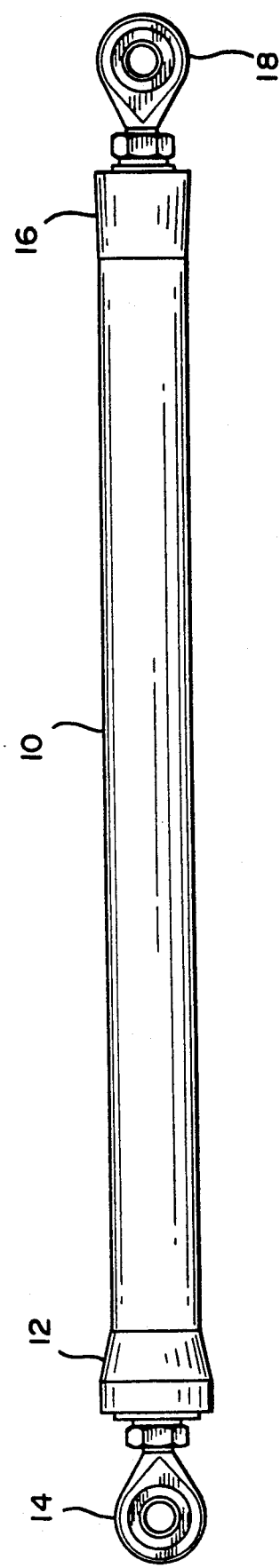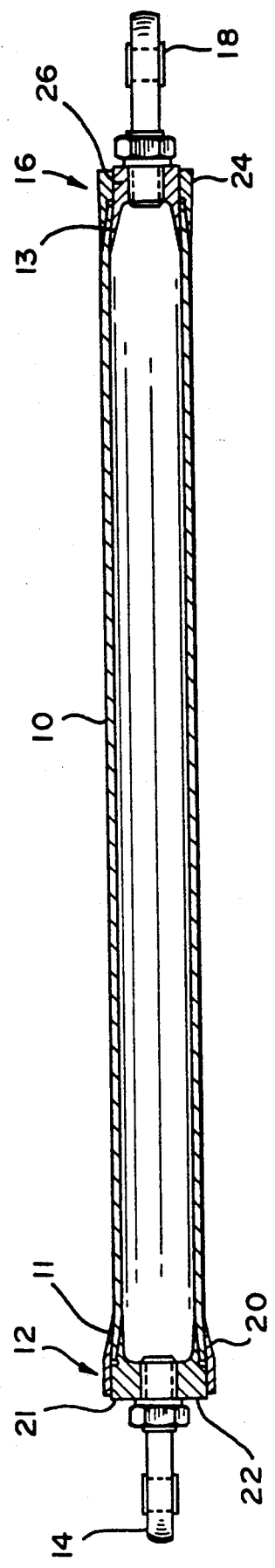

COMPOSITE TUBE STRUCTURE

BACKGROUND OF THE INVENTION

The present invention relates generally to composite tubular structural members having attachment means at their ends. In particular, this invention relates to such a composite tubular structure in which the end of the tube is precisely formed in a flared or tapered configuration to close dimensional tolerances. A method for fabricating such a tube is thoroughly described in U.S. Pat. No. 4,849,152 describing a cone control method for fabricating composite tubes. In this referenced patent, a composite tube is formed by means of winding preimpregnated composite materials on a mandrel having a desired shape and the dimensions desired for the finished tube. In particular, this referenced patent describes a means of forming a precision flared or tapered end on such a tube for means of adapting it to a coupling system.

This invention describes such a composite tubular strut and in particular the means of attaching to the ends of the tubing an end structure for allowing attachment of the strut into the next assembly. As will be described, the strut may be manufactured to a precise length strut with its end fitting without requiring incorporation of metallic ends in the tube or drilling or otherwise cutting the fibers of the tube in assembly. Additionally, the end fittings may be removed and replaced without damaging the tube.

In the prior art of composite tubular assemblies, attachment of the end assemblies has required that means for such attachment being incorporated in the tube. For example, an end attachment ring may be wound into the end of the tube when the tube is fabricated and cured. In these assemblies, the difficulty is in assuring secure attachment of the metal fitting to the composite tube. The failure of such assemblies is usually caused by the composite member separating from the metallic end piece. To prevent such failure, it is common practice to drill matching holes through the tube and its end piece and secure them together using rivets, threaded members or other conventional fastening means. This method assures the integrity of the metal to composite attachment, however, drilling holes through a composite tube cuts the fibers drilled and causes a weakness in the tube possibly reducing its useful life. In addition, the presence of holes and fasteners in the metal fitting subject it to fretting fatigue failures. Additionally, these methods of applying an end piece to a tube do not allow the end piece to be replaced or changed to an alternate method of attachment.

It would be desirable to have a composite tubular strut with an attachment fitting in which the fittings may be changed or the tube changed without damage to any of the other parts. It is also desirable to provide an end attachment to a composite tube without cutting or drilling the tube fibers to make such an attachment.

OBJECTS AND SUMMARY OF THE INVENTION

One object of the present invention is to provide a means of attaching an end fitting structure to a tubular composite tube which is readily removable or replaceable. Another object of the invention is to utilize a flared or tapered tubular tube to effect a secure attachment to the end fitting. Yet, another object of this invention is to provide an end fitting for a tubular composite tube which does not require cutting the fibers in the tube and drilling holes in the metal end attachment. Yet, another object to this invention is to provide an end fitting for a composite tubular structure which may be easily replaced without damage to the tube or the end fitting.

The present invention utilizes a hollow composite tube of filament wound or tape wound structure which is provided at its end with a flared or tapered portion which has been precisely formed to provide an exact geometry of taper and thickness throughout the flared end. Such a tube requires no machining after curing and may be used precisely as it comes from the curing process. To attach the end fitting, an externally tapered inner member is inserted in the inside of the tapered portion of the end of the tube. The tapered portion of this member is configured to precisely match the internal surface of the flared end of the tube. A second attachment member having an internally tapered diameter of the same configuration as the external surface of the flared end of the tube is provided. This external member slides over the internal member and the flared end of the tube and slides over the external surface of the internal member. As the external member is forced axially onto the internal member, the flared end of the tube contained between these two members is compressed at a precise pressure to secure the tubes to the fitting. When the precise assembly pressure has been attained the two end fitting pieces are fastened firmly together by means of pins or other known fastening method. In assembly, the external member may be heated to expand its internal diameter slightly before it is slipped over the inner end piece. Thus, when the external member cools, a precise pressure is applied to the flared end of the composite tube by the shrinking of the external member. By precise dimensional control of the flared end of the tube and the two end members, the tube is securely held to its end fitting. The tube is secured both by friction between the end pieces and the tube and by the flare on the end of the tube trapped in a mating cavity formed by the two end pieces. Frictional values as high as 0.45u have been demonstrated in tests.

This assembly may also be accomplished by providing a precise tapered end on the tube in place of the flared end described above. While the direction of the tapers is reversed, the attachment is made in substantially the same manner.

BRIEF DESCRIPTION OF THE DRAWINGS

FIG. 1 is an assembly drawing of a composite tubular tube utilizing the invention.

FIG. 2 is a sectional view of FIG. 1 rotated 90 degrees above the long axis of the tube.

DETAILED DESCRIPTION OF A PREFERRED EMBODIMENT

Figure 3:
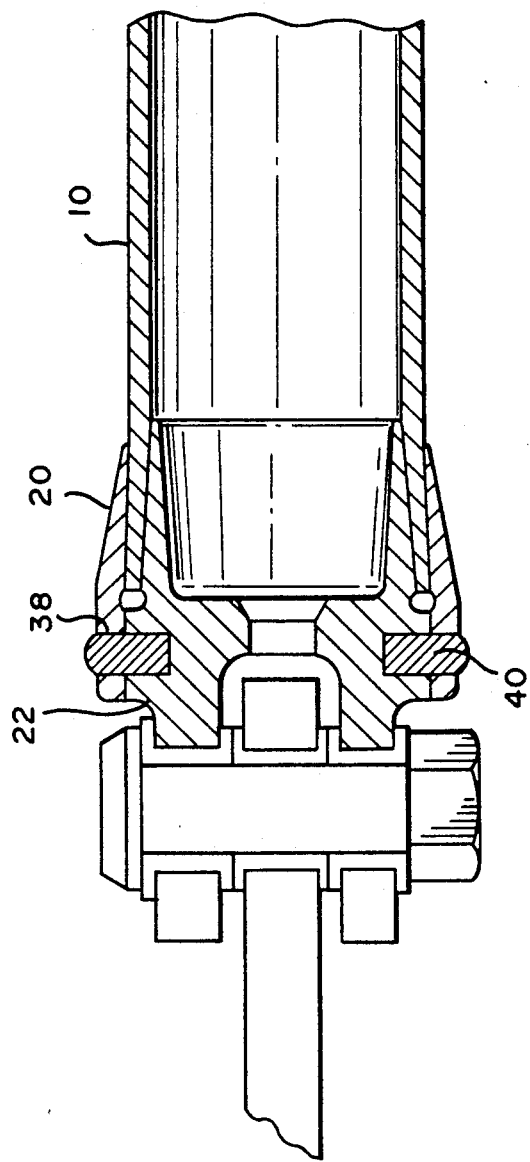
FIG. 3 is an enlarged sectional view of one end of the tube of FIG. 2.

Referring now to FIG. 1 there is shown a general overall view of one embodiment of the invention. FIG.

1 illustrates a strut or tube member useable with in any type of truss construction. This strut is comprised of a tube 10 which is wound of filaments or preimpregnated composite tapes in any well known manner. The composite fiber with its epoxy binder is wound on mandrel having the form of the basic tube. The method forming the ends of such a tube is described in more detail in U.S. Pat. No. 4,849,152. At one end of the tube 10 there is provided a connector 12 for use in conjunction with the flared end of the tube. At the end of the connector 12 is a rod end member 14 for attaching the strut to an additional structure. At the other end of tube is connector 16 which is used in conjunction with the tapered end tube to be discussed below. Attached to the connector 16 is an attachment member 18 similar to 14 shown at the opposite end.

Referring now to FIG. 2, additional details of the structure are shown in section. The tube 10, shown in section, is provided at the left end of the Figure with a flared end 11 and at the other end it is provided with a tapered end 13. The flared end of the tube 11 is assembled over an internal member 22 which has a tapered surface matching that of the flared end 11 of the tube 10. A collar 20 is assembled over the outside of the flared end of the tube 10 and contains an internal tapered surface which matches to the external surface of the flared end of the tube. Collar 20 is assembled on the tube 10 before the internal member 22 is inserted. The collar is then moved toward the right end of the tube over the flared end of the tube and over the internal member 22. The thickness of the tube wall at the flared end 11 is carefully controlled as is the gap between the tapered surfaces of the internal member 22 and the collar 20. Once assembled, the collar 20 is moved toward the right end of the tube a sufficient amount to impose a predetermined hoop pressure on the flared end of the tube. The detail of this assembly will be discussed below.

At the opposite end of the assembly of FIG. 2 an example is shown of a similar connector in which the end of the tube 10 is tapered at 13. In this case, the internal member 26 has an outwardly flaring taper which corresponds in geometry and dimensions to the inside surface of the tapered portion 13 of the tube 10. This member is assembled inside the tube as the first step of assembly. Collar 24 has an internal taper precisely matching the external surface of the tapered end of the tube 10. Again, as in the case of the flared end tube discussed above, the collar 24 is moved along the internal member 26 until the predetermined hoop pressure is applied to the tapered end 13 of the tube 10.

Referring now to FIG. 3, an enlarged sectional view of the connector 12 of FIG. 1 is shown. In this embodiment, the assembly system is the same as that described in connection with the left end of the assembly of FIG. 1. That is, the internal member 22 is inserted into the flared end of the tube 10 which is precisely formed in geometry and surface finish. Next, the collar 20 is moved to the right such that its internal tapered surface matches the external flared surface of the tube 10. In assembly, the collar 20 is moved to the right end of the tube until the flared end of the tube 11 is securely clamped between the collar 20 and the internal member 22. The location of the collar on the internal member is carefully scribed on the collar. By means of preselected calculations it is known precisely the amount that the collar 20 must be moved to the right to achieve the desired hoop pressure on the flared end of the tube. For example, in a typical assembly it would be desirable to achieve a bearing stress of 20,000 psi on the tube. In order to move the collar a precise amount, the collar is heated to expand its internal diameter and the collar is moved the prescribed amount to the right of the assembly. As the collar cools, the precise bearing stress is applied to the flared end 11 of the tube 10 by means of the collar 20 and the internal member 22. The collar 20 has a pair of pre-drilled holes 38 through its untapered portion. When the collar is in the correct position in relation to the internal member 22, matching holes are drilled in the internal member 22 and pins 40 are inserted to lock the members 20 and 22 in their correct relationship for maintaining the secure attachment to the tube at the predetermined pressure.

Figure 4:
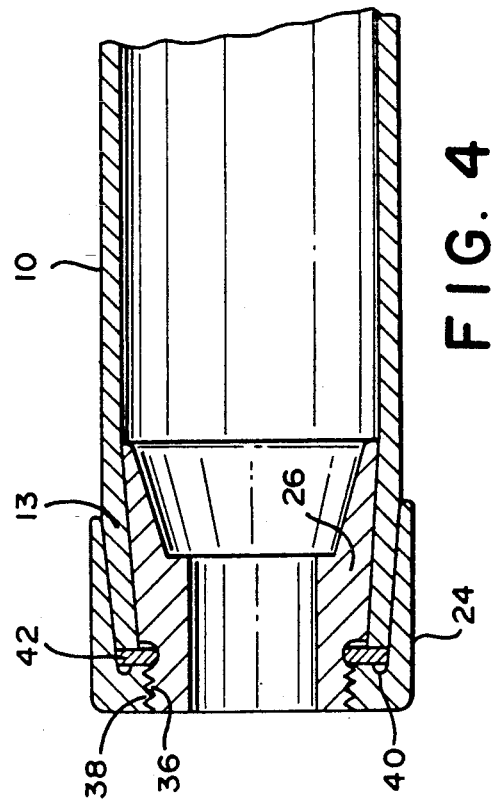
FIG. 4 is a sectional view of the other end of the tube of FIG. 2.

Referring now to FIG. 4, there is shown the method of attaching the tube to the end connector where the tube is provided with an inwardly tapering portion 13. In this assembly, the internal member 26 is inserted at the opposite end of the tube and moved through the tube until it contacts the inwardly tapering portion of the tube 13. The collar 24 can then be applied from the left end of the tube over the inwardly tapering portion 13 of the tube. In this embodiment, a different method of applying the appropriate pre-stress is utilized. Here the internal member 26 is provided with external threads 36 and the collar 24 has internal matching threads 38. To achieve the appropriate preload, the collar 24 is threaded onto the internal member 26 to a point at which it just contacts the end of the tube 10. The gap 40 between the collar and the internal member 26 is measured precisely. By reason of the known geometry of the tube and the internal member and the collar it can be determined how much the collar 24 must be threaded onto the internal member 26 to achieve the appropriate preload. With this dimension in mind, it can be determined how much the gap 40 must be reduced. A shim 42 is placed in the gap between the collar 24 and the internal member 26 and the collar then tightened until it is securely mated to the shim 40. The collar 24 may be heated to assist in the assembly process. The collar 24 may then be locked in place by any known means, for example, a jam nut may be used or the collar may be pinned to the internal member in the manner described in connection with FIG. 3 above.

Figure 5:
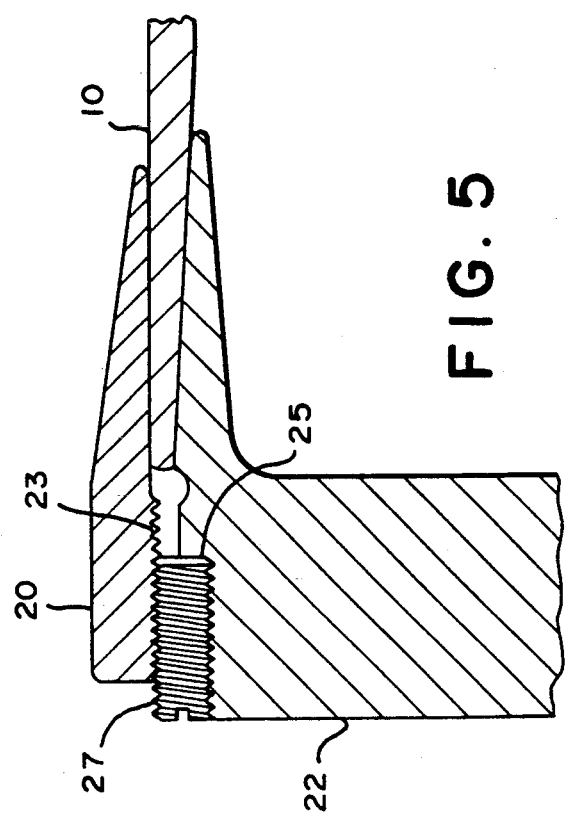
FIG. 5 is a sectional view of another embodiment of the invention.

Referring now to FIG. 5, there is shown a partial enlarged sectional view of an alternate method of axially positioning the internal and external members during assembly. In this embodiment, the external member 20 is provided with a semi-circular threaded hole 23 which extends through the cylindrical portion of member 20. The internal member 22 is provided with a matching unthreaded blind semi-circular hole 25. A screw 27 is inserted into hole 25 and threaded into hole 23. As the screw 27 is advanced, the external and internal members are moved axially relative to each other and the flared end of the tube 10 is secured between the end members. This detail is repeated diametrically opposite at the other side of the assembly. At least two such screws would be provided to maintain alignment of the end members during positioning. However the number could be increased so long as their positions were symmetrically arranged.

Figure 6:
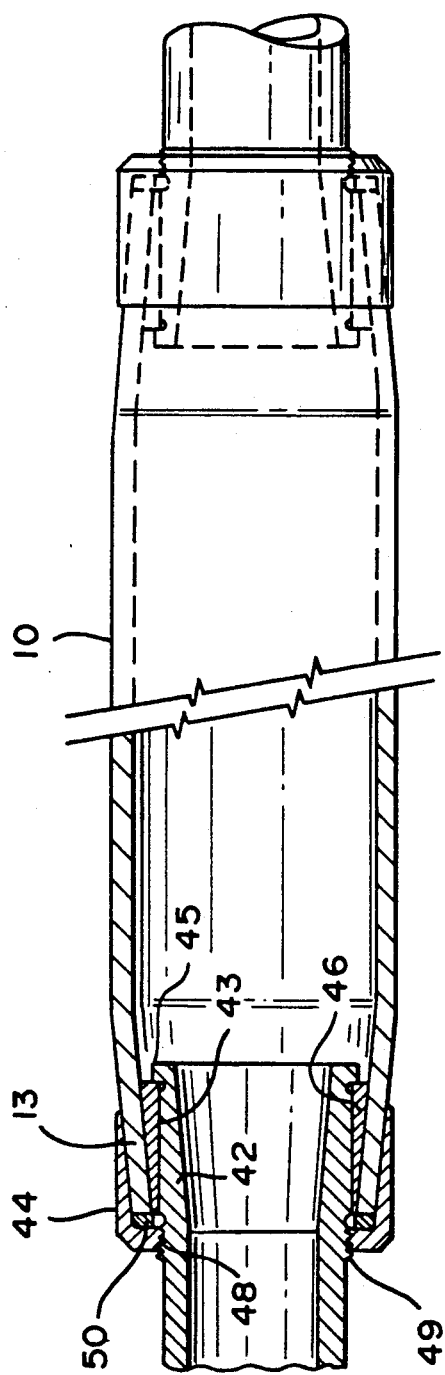
FIG. 6 is an assembly drawing of another embodiment of the invention.
Figure 7:
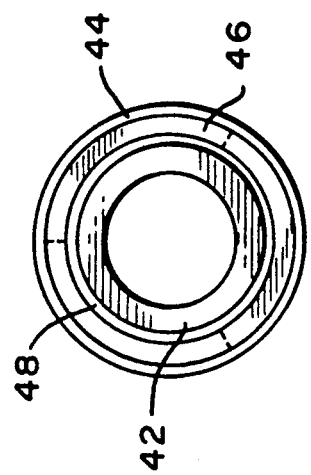
FIG. 7 is an end view of the embodiment of FIG. 6.

Referring now to FIGS. 6 and 7, there is shown another embodiment of the invention which provides substantially the same means for attaching the end connector to the tube as has been described in connection with FIGS. 3 and 4 above. The same tube 10 is provided with a tapered end portion 13. The outer collar 44 has an internal surface tapered to match the external tapered surface 13 of the tube 10. The internal member 42 is provided with a straight diameter 43 with a shoulder 45 at its internal end.

In order to provide the pre-stress forces for completing the attachment, there are provided segmented arcuate wedges 43 arranged around the inside diameter of the tube 10. As shown in FIG. 7, each of the wedges is provided with a hole for it to aid in installing the wedges. In this embodiment, the inner member 42 is inserted well into the tube 10 past the tapered end 13. The wedges 43 are then installed to lie on the diameter 46 and against the shoulder 45 by the inner member 42. The inner member 42 is then drawn back into contact with the tapered portion 13 of the tube 10. As in the case of the embodiment shown in FIG. 4, there are provided threads 48 on the external diameter of the inner member 42 and internal threads on the collar 44. In the same manner described in connection with FIG. 4 above, a shim 50 is installed to establish the proper length and relationship between the collar and the inner member and the tube. Collar 44 may be threaded onto the inner member 42 by means of threads 48 and 49.

It is to be understood that the means illustrated for drawing the end members together and for fastening them in place can be used with either the flared end tube or the tapered end tube. Thus, for example, the screw threads shown in the tapered tube embodiment of FIG. 4 could be applied to the flared tube embodiment of FIG. 3. Likewise, the pin attachment shown in the embodiment of FIG. 3, could be applied to the embodiment of FIG. 4. One having ordinary skill in the art could readily adapt these fastening methods to either embodiment of the invention.

As mentioned above, by means of experimental, calculated and theoretical data, it has been determined that a working bearing stress on the composite tube when the connector is fully assembled of 20,000 pounds per square inch is acceptable. By way of illustration, using a tube having a nominal two inch outer diameter with appropriate sizing of the end pieces movement of the collar along the inner member an amount of approximately 0.06 inches will provide the desired bearing stress. Because the tapered or flared end of the tube, is volumetrically trapped between the inner member and it meeting collar, no substantial compression of the tube occurs. The stress is provided by the forces applied between the inner member and the collar when they are moved along their tapering surfaces. Thus, the end of the tube is not damaged which would cause a stress riser leading to early failure.

Thus, it can be seen as described therein an apparatus for connecting an end fixture to a composite tube and an accurate and precise manner without cutting the fibers of the tube or incorporating in the tube any metal fixtures for its attachment. In addition, the tube and the end connectors may be replaced without damage to any meeting parts.

I claim:

1. A composite tube assembly comprising:
a hollow tube of cured composite material having at least one flared end, said tube having an external flared surface and an internal flared surface, said flared end of said tube having a tapered wall thickness which tapers to a thinner wall at the end of the flared end of the tube;
a cylindrical internal end member slideably inserted in the flared end of said tube and having an externally flared surface at one end of approximately the same geometry and dimension as the internal surface of the flared end of said tube;
a hollow cylindrical external end member assembled over the flared end of said tube and the internal end member and having an internal tapered surface at one end of approximately the same geometry and dimension as the external surface of the flared end of said tube;
means for drawing said external end member and said internal end member axially together along the internal and external surfaces of the flared end of said tube for securing the flared end of said tube therebetween under a predetermined pressure; and
means for fastening said internal end member to said external end member and said tube when their axial relationship establishes a predetermined stress on the flared end of said tube.

2. The composite tube assembly according to claim 1 wherein the means for fastening and drawing said internal and external end members together axially comprises external threads on the distal end of the internal end member and matching internal threads on the distal end of the external end member, whereby threading the external end member on to the internal end member causes relative axial motion of the two end members.

3. The composite tube assembly according to claim 1 wherein the means for fastening the internal end member to the external end member comprises a plurality of pins inserted into matching holes drilled in the internal and external end members after the end members have been axially positioned.

4. The composite tube assembly according to claim 1 wherein the means for drawing the internal and external end members together axially comprises at least two semi-circular threaded holes extending axially through an internal surface of the external end member diametrically opposite each other and two matching unthreaded semicircular holes in an outer surface of the internal end member, said unthreaded holes extending only part way through said outer surface, and threaded screw members assembled in the unthreaded semicircular holes abutting the end thereof and threaded into the threaded semi-circular holes in the external end member whereby turning the screws in the threaded holes moves the end members axially relative to each other.

5. A composite tube assembly comprising:
a hollow tube of cured composite material having at least one tapered end, said tube having an external tapered surface and an internal tapered surface, said tapered end of said tube having a tapered wall thickness which tapers to a thinner wall at the end of the tapered end of the tube;
a cylindrical internal end member slideably inserted in the tapered end of said tube and having an externally tapered surface at one end of approximately the same geometry and dimension as the internal surface of the tapered end of said tube;
a hollow cylindrical external end member assembled over the tapered end of said tube and the internal end member and having an internal flared surface at one end of approximately the same geometry and dimension as the external surface of the tapered end of said tube;
means for drawing said external end member and said internal end member axially together along the internal and external surfaces of the tapered end of said tube for securing the tapered end of said tube therebetween under a predetermined pressure; and means for fastening said internal end member to said external end member and said tube when their axial relationship establishes a predetermined stress on the tapered end of said tube.

6. The composite tube assembly according to claim 5 wherein the means for fastening and drawing said internal and external end members together axially comprises external threads on the distal end of the internal end member and matching internal threads on the distal end of the external end member, whereby threading the external end member on to the internal end member causes relative axial motion of the two end members.

7. The composite tube assembly according to claim 5 wherein the means for fastening the internal end member to the external end member comprises a plurality of pins inserted into matching holes drilled in the internal and external end members after the end members have been axially positioned.

8. The composite tube assembly according to claim 5 wherein the means for drawing the internal and external end members together axially comprises at least two semi-circular threaded holes extending axially through an internal surface of the external end member diametrically opposite each other and two matching unthreaded semicircular holes in an outer surface of the internal end member, said unthreaded holes extending only part way through said outer surface, and threaded screw members assembled in the unthreaded semicircular holes abutting the end thereof and threaded into the threaded semi-circular holes in the external end member whereby turning the screws in the threaded holes moves the end members axially relative to each other.

* * * * *